United States Patent
Aoshima et al.

(10) Patent No.: US 10,586,565 B2
(45) Date of Patent: Mar. 10, 2020

(54) MAGNETIC RECORDING MEDIUM HAVING SPECIFIED POLYESTER RESIN ADDITIVE AND MAGNETIC RECORDING MEDIUM COMPOSITION

(71) Applicant: FUJIFILM Corporation, Tokyo (JP)

(72) Inventors: Toshihide Aoshima, Minami-ashigara (JP); Mika Imamura, Minami-ashigara (JP); Shinji Tsujimoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 180 days.

(21) Appl. No.: 15/474,504

(22) Filed: Mar. 30, 2017

(65) Prior Publication Data
US 2017/0287518 A1   Oct. 5, 2017

(30) Foreign Application Priority Data
Mar. 31, 2016  (JP) ................. 2016-073507

(51) Int. Cl.
| | |
|---|---|
| G11B 5/71 | (2006.01) |
| G11B 5/714 | (2006.01) |
| G11B 5/702 | (2006.01) |
| C08K 3/22 | (2006.01) |
| C08K 5/101 | (2006.01) |

(52) U.S. Cl.
CPC .......... *G11B 5/71* (2013.01); *C08K 3/22* (2013.01); *C08K 5/101* (2013.01); *G11B 5/7021* (2013.01); *G11B 5/7023* (2013.01); *G11B 5/714* (2013.01); *C08K 2003/2272* (2013.01)

(58) Field of Classification Search
None
See application file for complete search history.

(56) References Cited

U.S. PATENT DOCUMENTS

| | | | | |
|---|---|---|---|---|
| 9,751,997 | B2 * | 9/2017 | Ogura ................ | C08F 265/06 |
| 9,761,261 | B2 * | 9/2017 | Aoshima ............ | G11B 5/7021 |
| 2002/0114977 | A1 * | 8/2002 | Kubota .............. | B32B 27/36 |
| | | | | 428/844.5 |
| 2008/0187783 | A1 * | 8/2008 | Doi ................... | G11B 5/73 |
| | | | | 428/831 |
| 2011/0003241 | A1 * | 1/2011 | Kaneko ............. | C08G 73/0206 |
| | | | | 430/7 |
| 2015/0093599 | A1 * | 4/2015 | Fukagawa .......... | G11B 5/7013 |
| | | | | 428/842.3 |
| 2015/0279404 | A1 | 10/2015 | Aoshima et al. | |
| 2016/0093323 | A1 * | 3/2016 | Omura ............... | G11B 5/733 |
| | | | | 428/840.3 |
| 2017/0313042 | A1 * | 11/2017 | Nakamori ........... | B32B 27/08 |
| 2018/0061446 | A1 * | 3/2018 | Kasada .............. | G11B 5/00817 |

FOREIGN PATENT DOCUMENTS

| | | |
|---|---|---|
| JP | 2004-067941 A | 3/2004 |
| JP | 2005-108291 A | 4/2005 |
| JP | 2015-201241 A | 11/2015 |

OTHER PUBLICATIONS

Office Action dated Dec. 18, 2018 from the Japanese Patent Office in counterpart JP Application No. 2016-073507.
Office Action dated Jun. 18, 2019, from the Japanese Patent Office in counterpart Japanese application No. 2016-073507.

* cited by examiner

*Primary Examiner* — Kevin M Bernatz
(74) *Attorney, Agent, or Firm* — Sughrue Mion, PLLC

(57) ABSTRACT

The magnetic recording medium contains, in a magnetic layer, a fatty acid ester and a polyester resin having a number average molecular weight of greater than or equal to 1,000 but less than 20,000, and containing a structural unit derived from a polyvalent carboxylic acid and a structural unit derived from a polyol, as well as 10 mol % to 50 mol % of a structural unit, derived from a cyclic polyvalent carboxylic acid selected from the group consisting of an alicyclic polyvalent carboxylic acid and an aromatic polyvalent carboxylic acid, per 100 mol % of a combined total of the above structural units, and one or more partial structures selected from the group consisting of the following partial structures:

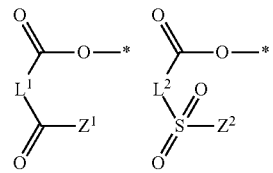

wherein each of $L^1$ and $L^2$ independently denotes a divalent connecting group, and each of $Z^1$ and $Z^2$ independently denotes a monovalent group denoted by —OM or a monovalent group denoted by —O⁻A⁺.

17 Claims, No Drawings

MAGNETIC RECORDING MEDIUM HAVING SPECIFIED POLYESTER RESIN ADDITIVE AND MAGNETIC RECORDING MEDIUM COMPOSITION

CROSS-REFERENCE TO RELATED APPLICATIONS

This application claims priority under 35 U.S.C 119 to Japanese Patent Application No. 2016-073507 filed on Mar. 31, 2016. The above application is hereby expressly incorporated by reference, in its entirety.

BACKGROUND OF THE INVENTION

Field of the Invention

The present invention relates to a magnetic recording medium and a magnetic recording medium composition.

Discussion of the Background

Particulate magnetic recording media (also referred to simply as "magnetic recording media", hereinafter) are normally fabricated by coating a composition containing ferromagnetic powder and binder directly or indirectly—over another layer such as a nonmagnetic layer—on a nonmagnetic support, to form a magnetic layer.

In particulate magnetic recording media, the binder has conventionally played important roles in dispersing the ferromagnetic powder, increasing the durability of the magnetic layer, and the like. To this end, various study of binders has been conducted (for example, see Japanese Unexamined Patent Publication (KOKAI) No. 2004-67941, which is expressly incorporated herein by reference in its entirety).

SUMMARY OF THE INVENTION

As described in Japanese Unexamined Patent Publication (KOKAI) No. 2004-67941, polar groups are incorporated into the binder to enhance dispersion of the ferromagnetic powder. Polar groups are introduced into the binder to enhance dispersion by causing the binder to effectively adsorb to the surface of the ferromagnetic powder. However, as also described at paragraph 0026 in Japanese Unexamined Patent Publication (KOKAI) No. 2004-67941, the introduction of an excessive quantity of polar groups tends to compromise dispersion of the ferromagnetic powder. Accordingly, it is difficult to achieve adequate enhancement of dispersion of ferromagnetic powder by incorporating polar groups into the binder.

The use of resins with good mechanical properties as binder in the magnetic layer has been studied to increase the durability of the magnetic layer. In this regard, Japanese Unexamined Patent Publication (KOKAI) No. 2004-67941 proposes the using of a prescribed copolymer component such as an aromatic polyisocyanate to increase the concentration of polyurethane groups in order to enhance the mechanical properties of polyurethane resin employed as binder in the magnetic layer. However, as described at paragraph 0025 in Japanese Unexamined Patent Publication (KOKAI) No. 2004-67941, although the mechanical properties of the resin can improve as the concentration of urethane groups is increased in the resin employed as binder, solubility also decreases. As a result, dispersion of the ferromagnetic powder also tends to decrease. For this reason, it is stated at paragraph 0025 in Japanese Unexamined Patent Publication (KOKAI) No. 2004-67941 that the urethane group concentration should be kept within a range at which good dispersion of the ferromagnetic powder can be achieved.

As set forth above, it is becoming difficult to achieve both enhanced durability and enhanced dispersion of ferromagnetic powder in the magnetic layer in a magnetic recording medium by means of the binder in the conventional manner.

An aspect of the present invention provides for a magnetic recording medium that can achieve both enhanced durability and enhanced dispersion of ferromagnetic powder in the magnetic layer.

An aspect of the present invention relates to a magnetic recording medium having a magnetic layer containing ferromagnetic powder and binder on a nonmagnetic support, wherein:

the magnetic layer further contains a fatty acid ester and a polyester resin with a number average molecular weight of greater than or equal to 1,000 but less than 20,000;

the polyester resin contains a structural unit derived from a polyvalent carboxylic acid and a structural unit derived from a polyol, as well as 10 mol % to 50 mol % of a structural unit, derived from a cyclic polyvalent carboxylic acid selected from the group consisting of alicyclic polyvalent carboxylic acids and aromatic polyvalent carboxylic acids, per 100 mol % of the combined total of the structural unit derived from the polyvalent carboxylic acid and the structural unit derived from the polyol; and the polyester resin contains one or more partial structures selected from the group consisting of the partial structure denoted by formula 1 and the partial structure denoted by formula 2 below:

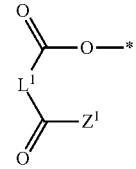

Formula 1

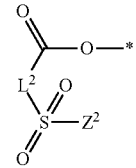

Formula 2

(where each of $L^1$ in formula 1 and $L^2$ in formula 2 independently denotes a divalent connecting group, and each of $Z^1$ in formula 1 and $Z^2$ in formula 2 independently denotes a monovalent group denoted by —OM or a monovalent group denoted by —O⁻A⁺, with M denoting a hydrogen atom or an alkali metal atom, A⁺ denoting an ammonium cation, and * denoting a bond position with another partial structure constituting the polyester resin).

A further aspect of the present invention relates to a magnetic recording medium composition containing ferromagnetic powder, binder, a fatty acid ester, and the above polyester resin.

In the present invention and the present specification, the definitions of terms and/or the methods of measuring physical properties are as follows.

The term "average molecular weight" (number average molecular weight and weight average molecular weight, described further below) refers to a value that is obtained by measurement by gel permeation chromatography (GPC) followed by standard polystyrene conversion. The number average molecular weights and weight average molecular weights given in Examples further below are values (polystyrene-converted values) obtained by taking values measured by GPC under the measurement conditions set forth below and subjecting them to standard polystyrene conversion.

GPC device: HLC-8220 (made by Tosoh Corp.)
Guard column: TSK guard column Super HZM-H
Column: TSKgel Super HZ 2,000, TSKgel Super HZ 4,000, TSKgel Super HZ-M (4.6 mm (inner diameter)×15.0 cm, three serially connected columns, made by Tosoh Corp.)
Eluent: tetrahydrofuran (THF) containing stabilizer (2,6-di-t-butyl-4-methylphenol)
Eluent flow rate: 0.35 mL/minute
Column temperature: 40° C.
Inlet temperature: 40° C.
Refractive index (RI) measurement temperature: 40° C.
Sample concentration: 0.3 weight %
Quantity of sample injected: 10 μL The term "binder" refers to one or more resins. Resin is a polymer containing multiple identical or different structural units. The term polymer is used to include homopolymers and copolymers. However, in the present invention and the present specification, the term "binder" does not include the above polyester resin. That is, the above magnetic layer and magnetic recording medium composition contain the above polyester resin, as well as a resin (binder) in addition to the above polyester resin.

In one embodiment, the above divalent connecting group is an alkylene group having 1 to 10 carbon atoms, an alkenylene group having 2 to 10 carbon atoms, or an aromatic group having 6 to 12 carbon atoms.

In one embodiment, the above magnetic layer and magnetic recording medium composition contain 0.5 to 50.0 weight parts of the above polyester resin per 100.0 weight parts of ferromagnetic powder.

In one embodiment, the above binder is one or more resins selected from the group consisting of polyurethane resins and vinyl chloride resins.

In one embodiment, the average particle size of the above ferromagnetic powder falls within a range of 10 nm to 50 nm.

An aspect of the present invention makes it possible to achieve both enhanced dispersion of ferromagnetic powder and enhanced durability in the magnetic layer of a particulate magnetic recording medium.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

Unless specifically stated otherwise, the groups that are set forth in the present invention and the present specification can be substituted or unsubstituted. When a substituent is present in a given group, examples of substituents are alkyl groups (such as alkyl groups having 1 to 6 carbon atoms), hydroxy groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, carboxyl groups, salts of carboxyl groups, sulfonic acid groups, and salts of sulfonic acid groups. In a group having a substituent, the term "number of carbon atoms" means the number of carbons including the number of carbon atoms of the substituent unless specifically stated otherwise.

In the present invention and present specification, the term "ferromagnetic powder" means a collection of multiple ferromagnetic particles. The term "collection" is not limited to forms where the particles constituting the collection are in direct contact, but also includes forms where the binder and/or additives and the like are present between the particles. The same applies to other types of powder such as nonmagnetic powder.

The average particle size of powder in the present invention and present specification is a value measured with a transmission electron microscope by the following method.

Powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and present specification, the average particle size of various types of powder is the average particle size as obtained by the above method. The average particle size indicated in Examples further below was obtained using a Model H-9000 transmission electron microscope made by Hitachi and KS-400 image analysis software made by Carl Zeiss.

In the present invention and present specification, the size of the particles constituting powder (referred to as the "particle size", hereinafter) is denoted as follows based on the shape of the particles observed in the above particle photograph:
(1) When acicular, spindle-shaped, or columnar (with the height being greater than the maximum diameter of the bottom surface) in shape, the particle size is denoted as the length of the major axis constituting the particle, that is, the major axis length.
(2) When platelike or columnar (with the thickness or height being smaller than the maximum diameter of the plate surface or bottom surface) in shape, the particle size is denoted as the maximum diameter of the plate surface or bottom surface.
(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obt29ned for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

The average particle size set forth above can be obtained by observing the powder present under a transmission electron microscope. The powder that is contained in the magnetic layer and the like of the magnetic recording medium can be obtained by collecting powder from a magnetic recording medium to obtain a measurement sample. The method described in, for example, paragraph 0015 of Japanese Unexamined Patent Publication (KOKAI) No. 2011-048878, which is expressly incorporated herein by reference in its entirety, can be employed as the method of collecting a sample for measurement.

Magnetic Recording Medium

An aspect of the present invention relates to a magnetic recording medium having a magnetic layer containing ferromagnetic powder and binder on a nonmagnetic support, wherein the magnetic layer further contains a fatty acid ester and a polyester resin having a number average molecular weight greater than or equal to 1,000 but less than 20,000; the polyester resin contains a structural unit derived from a polyvalent carboxylic acid and a structural unit derived from a polyol, as well as 10 mol % to 50 mol % of a structural unit, derived from a cyclic polyvalent carboxylic acid selected from the group consisting of alicyclic polyvalent carboxylic acids and aromatic polyvalent carboxylic acids, per 100 mol % of the combined total of the structural unit derived from the polyvalent carboxylic acid and the structural unit derived from the polyol; and the polyester resin contains one or more partial structures selected from the group consisting of the partial structure denoted by formula 1 and the partial structure denoted by formula 2 above.

As a result of extensive research, the present inventors discovered that a magnetic recording medium having a magnetic layer containing the above polyester resin could afford both improved dispersion of ferromagnetic powder in the magnetic layer and good durability. The present inventors presume (1) and (2) below in this regard.

(1) The partial structure denoted by formula 1 and/or the partial structure denoted by formula 2 is a group including the monovalent group denoted by —OM or the monovalent group denoted by —O⁻A⁺, that are generally considered to be a polar group. The present inventors presume the fact that the above polyester resin contains such a group in a specific partial structure, that is, the partial structure denoted by formula 1 and/or the partial structure denoted by formula 2, can contribute to enhancing dispersion of the ferromagnetic powder. The present inventors further presume that the fact that the polyester resin has a number average molecular weight of greater than or equal to 1,000 but less than 20,000 and is a resin of lower molecular weight than the resins that are normally employed as binder in magnetic recording media can contribute to enhancing dispersion of the ferromagnetic powder.

(2) In terms of enhancing the durability of the magnetic recording medium, the present inventors presume that the effect of the polyester resin—being capable of causing the fatty acid ester that is also present in the magnetic layer to be disproportionately present on the surface of the magnetic layer—can contribute to enhancing the durability of the magnetic recording medium, specifically, the scratch-resistance of the magnetic layer (more particularly, causing the surface of the magnetic layer to be difficult to be shaved by contact with the recording head during the recording and/or reproduction of information). This will be described in greater detail below.

The fatty acid ester is a type of lubricant. Lubricants can be roughly divided into fluid lubricants and boundary lubricants. Fatty acid esters are said to be components that can function as fluid lubricants. A fluid lubricant is thought to play the role of protecting the surface of the magnetic layer by forming a liquid film on the surface of the magnetic layer. Accordingly, the more a fatty acid ester tends to be disproportionately present on the surface of the magnetic layer, the thicker the liquid film on the surface of the magnetic layer and thus the stronger the protective effect of the liquid film on the surface of the magnetic layer is presumed to be. In this regard, the present inventors presume that the polyester resin has the effect of promoting the disproportionate presence of the fatty acid ester on the surface of the magnetic layer. The present inventors presume that the fact that the polyester resin contains a structural unit derived from a cyclic polyvalent carboxylic acid selected from the groups of alicyclic multivalent carboxylic acids and aromatic polyvalent carboxylic acids in a proportion falling within the range set forth above can primarily contribute to this effect. The polyester resin is presumed to have poor compatibility with fatty acid esters. This presumably makes it difficult for a fatty acid ester to be kept within the magnetic layer, causing it to be disproportionately present on the surface of the magnetic layer. As a result, due to the increased thickness of the liquid film of fatty acid ester on the surface of the magnetic layer, the surface of the magnetic layer can be better protected by the liquid film of fatty acid ester, which is presumed to enhance resistance to scratching.

However, the above are merely presumptions by the present inventors. The present invention is not to be construed as being limited in any way by the presumptions of the present inventors set forth in the present specification.

The above magnetic recording medium will be described in greater detail below.

[Polyester Resin]

<Number Average Molecular Weight>

The number average molecular weight of the above polyester resin is greater than or equal to 1,000 but less than 20,000. Having the number average molecular weight fall within this range is presumed to contribute to enhancing dispersion of the ferromagnetic powder in the magnetic layer containing the above polyester resin. In particular, the present inventors presume that the fact that the above polyester resin is a resin of lower molecular weight than the resins that are normally employed as binder in magnetic recording media can contribute to enhance dispersion of the ferromagnetic powder in the magnetic layer containing the above polyester resin. From the perspective of further enhancing dispersion of the ferromagnetic powder, the number average molecular weight of the polyester resin is desirably less than or equal to 15,000, preferably less than or equal to 12,000, more preferably less than or equal to 10,000, still more preferably less than or equal to 7,000, and yet more preferably, less than or equal to 5,000. The number average molecular weight of the polyester resin is greater than or equal to 1,000, desirably greater than or equal to 1,200, and preferably, greater than or equal to 1,500.

The polyester resin is the resin synthesized by polycondensation of a polyvalent carboxylic acid and a polyol. Accordingly, the polyester resin that is contained in the magnetic layer of the above magnetic recording medium contains a structural unit derived from a polyvalent carboxylic acid and a structural unit derived from a polyol. The term "structural unit derived from a polyvalent carboxylic acid" is a structural unit in the form following polycondensation of the carboxyl group contained in a polyvalent carboxylic acid with the hydroxyl group contained in a polyol. The term "structural unit derived from a polyol" is a structural unit in the form following polycondensation of the hydroxyl group contained in a polyol with the carboxylic group contained in a polyvalent carboxylic acid group. The polyvalent carboxylic acid is a compound containing two or more carboxyl groups per molecule. The number of carboxyl groups contained per molecule desirably falls within a range of 2 to 4, preferably within a range of 2 or 3, and more preferably, is 2; that is, the polyvalent carboxylic acid is more preferably a dicarboxylic acid. The polyol is a compound containing two or more hydroxyl groups per molecule. The number of hydroxyl groups contained per molecule desirably falls within a range of 2 to 6, preferably within a range of 2 to 4, and more preferably, is 2; that is, the polyol is more preferably a diol.

<Structural Unit Derived from Cyclic Polyvalent Carboxylic Acid>

The above polyester resin contains one or more structural units derived from cyclic polyvalent carboxylic acids selected from the group consisting of alicyclic polyvalent carboxylic acids and aromatic polyvalent carboxylic acids. The ratio accounted for by the structural unit derived from a cyclic polyvalent carboxylic acid in the polyester resin falls within a range of 10 mol % to 50 mol % per 100 mol % of the combined total of the structural unit derived from the polyol and the structural unit derived from the polyvalent carboxylic acid. The present inventors presume that having the structural unit derived from the cyclic polyvalent carboxylic acid be present in the polyester resin in the above ratio can contribute to enhancing the durability of the magnetic recording medium. Details regarding the presumptions of the present inventors in this regard are as set forth above. From the perspective of further enhancing durability, the above ratio desirably falls within a range of 20 mol % to 50 mol %, preferably within a range of 30 mol % to 50 mol %, and more preferably, within a range of 40 mol % to 50 mol %. The ratio of the various structural units such as structural units derived from cyclic polyvalent carboxylic acid accounted for in the polyester resin can be determined by a known identification method such as nuclear magnetic resonance (NMR). If the composition of the polymerizable composition employed to polymerize the polyester resin is known, the above ratio can be obtained from the composition. One structural unit, or two or more structural units of differing structure, that are derived from the cyclic polyvalent carboxylic acid, can be contained in the polyester resin. When two or more are contained, the above ratio refers to the combined total of the two or more. The same applies to the various contents and ratios given in the present invention and present specification.

The above cyclic polyvalent carboxylic acid can be denoted by formula 3: R-(L$^3$-COOH)m. In formula 3, R denotes an aliphatic ring or an aromatic ring. The number of carbon atoms constituting the ring of the aliphatic ring or aromatic ring denoted by R is desirably 3 to 12, preferably 4 to 10, more preferably 5 or 6, and further preferably, 6. The aromatic ring denoted by R can be a carbon ring or a hetero ring. A carbon ring (a ring comprised solely of carbon atoms) is desirable.

In formula 3, L$^3$ denotes a single bond or a divalent connecting group, and m denotes the number of carboxyl groups contained in the cyclic polyvalent carboxylic acid. Accordingly, m denotes an integer of greater than or equal to 2, with the desirable range being as set forth above. L$^3$ denotes a single bond or a divalent connecting group. The details regarding the divalent connecting group, set forth further below, are as set forth for the divalent connecting group contained in formula 1 or formula 2. L$^3$ is desirably a single bond. That is, in formula 3, the structure that is directly bonded through the carboxyl group to the aliphatic ring or aromatic ring denoted by R is desirably R—(COOH)m. In the aliphatic ring or aromatic ring denoted by R, the substitution position at which the carboxyl group is substituted either directly or through a divalent connecting group is not limited. The aliphatic ring or aromatic ring that is denoted by R can have a substituent in addition to the carboxyl group. Examples of substituents are those set forth by way of example above.

Specific examples of cyclic polyvalent carboxylic acids selected from the group consisting of alicyclic polyvalent carboxylic acids and aromatic polyvalent carboxylic acids are: aromatic polyvalent carboxylic acids such as terephthalic acid, phthalic acid, isophthalic acid, sulfoisophthalic acid, homophthalic acid, 1,2-phenylenediacetic acid, 1,3-phenylenediacetic acid, 1,4-phenylenediacetic acid, 1,2-phenylenedioxydiacetic acid, 4-carboxyphenoxyacetic acid, 4,4'-biphenyldicarboxylic acid, 2,6-naphthalenedicarboxylic acid, and 1,3,5-benzenetricarboxylic acid, 1,2,4,5-benzenetetracarboxylic acid; and alicyclic polyvalent carboxylic acids such as 1,3-cyclohexanedicarboxylic acid, 1,4-cyclohexanedicarboxylic acid, 1,1-cyclopropanedicarboxylic acid, 1,1-cyclobutanedicarboxylic acid, 3,3-tetramethyleneglutaric acid, 1,3-adamantanedicarboxylic acid, 1,3-adamantanediacetic acid, 1,3,5-cyclohexanetricarboxylic acid, and 1,2,3,4-cyclobutanetetracarboxylic acid.

The above polyester resin is desirably obtained by polymerizing a polymerizable composition containing 10 mol % to 50 mol % of the above cyclic polyvalent carboxylic acid per 100 mol % of the combined total of polyvalent carboxylic acid and polyol. The one or more partial structures selected from the group consisting of the partial structure denoted by formula 1 and the partial structure denoted by formula 2 can be introduced by modifying the polymer obtained by polymerizing the polymerizable composition. The above polyester resin can be obtained in the form of a polymer having the above partial structure by employing a polymerizable compound having the above partial structure as one or more polymerizable compounds contained in the polymerizable composition. In the present invention and the present specification, the term "polymerizable composition" refers to a composition that contains one or more polymerizable compounds, and the term "polymerizable compound" refers to a compound having a polymerizable group. A polymerizable composition that contains a polyvalent carboxylic acid and polyol, and desirably a polymerizable composition containing 10 mol % to 50 mol % of the cyclic polyvalent carboxylic acid per 100 mol % of the combined total of the polyvalent carboxylic acid and the polyol, can be polymerized to obtain a polymer containing the above structural unit derived from a cyclic polyvalent carboxylic acid in the ratio set forth above.

<Structural Units Derived from Other Polyvalent Carboxylic Acids>

The above polyester resin can optionally contain a structural unit derived from a polyvalent carboxylic acid in the form of a structural unit derived from a polyvalent carboxylic acid other than the cyclic polyvalent carboxylic acid and aromatic polyvalent carboxylic (also referred to hereinafter as "another polyvalent carboxylic acid"). Examples of other polyvalent carboxylic acids are aliphatic polyvalent carboxylic acids such as adipic acid, dimethyl malonic acid, 2,2-dimethyl succinic acid, glutaric acid, pimelic acid, azelaic acid, sebacic acid, and tricarballylic acid. When a structural unit derived from another polyvalent carboxylic acid is contained, the polyester resin desirably contains the structural unit derived from another polyhydric carboxylic acid in a ratio of less than or equal to 25 mol %, preferably in a ratio of less than or equal to 20 mol %, relative to 100 mol % of the combined total of structural units derived from polyvalent carboxylic acids and structural units derived from polyols. It is possible for the polyester resin not to contain structural units derived from other polyvalent carboxylic acids; not containing them is desirable.

The ratio accounted for in the above polyester resin by the combined total of structural units derived from polyvalent carboxylic acids including structural units derived from the above cyclic polyvalent carboxylic acid and structural units derived from other carboxylic acids desirably falls within a range of 20 mol % to 50 mol %, preferably within a range of 30 mol % to 50 mol %, per 100 mol % of the combined total of structural units derived from a polyvalent carboxylic acid and structural units derived from a polyol. In the present invention and the present specification, the term "structural unit" refers to a partial structure derived from a polymerizable compound. The polyester resin is desirably comprised of structural units derived from a polyvalent carboxylic acid and structural units derived from a polyol, and the structural units in the polyester resin preferably consists of structural units derived from a polyvalent carboxylic acid and structural units derived from a polyol.

<Structural Units Derived from Polyol>

The structural unit derived from a polyol that is contained in the above polyester resin can have a linear structure, branched structure, or cyclic structure. Examples of the polyol imparting the structural unit derived from a polyol to the polyester resin are various aliphatic, alicyclic, and aromatic polyols, such as ethylene glycol, propylene glycol, diethylene glycol, triethylene glycol, propanediol, butanediol, pentanediol, hexanediol, octanediol, nonanediol, cyclohexanediol, cyclohexanedimethanol, neopentyl glycol, and bisphenol A. Polycaprolactone diols and polyvalerolactone diols obtained by ring-opening polymerization of lactones such as ε-caprolactone and γ-valerolactone are further examples.

The structural unit derived from a polyol can be contained in the polyester resin in a ratio of, for example, 40 mol % to 50 mol %, desirably 45 mol % to 50 mol %, per 100 mol % of the combined total of structural units derived from polyvalent carboxylic acids and structural units derived from polyols.

<Partial Structure Denoted by Formula 1, Partial Structure Denoted by Formula 2>

The above polyester resin contains one or more partial structures selected from the group consisting of the partial structure denoted by formula 1 below and the partial structure denoted by formula 2 below. The present inventors presume that this can contribute to enhancing the dispersion of ferromagnetic powder in the magnetic layer.

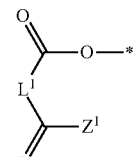

Formula 1

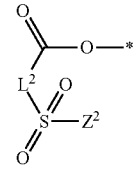

Formula 2

(Each of $L^1$ in formula 1 and $L^2$ in formula 2 independently denotes a divalent connecting group, and each of $Z^1$ in formula 1 and $Z^2$ in formula 2 independently denotes a monovalent group denoted by —OM or a monovalent group denoted by —O⁻A⁺, with M denoting a hydrogen atom or an alkali metal atom, A⁺ denoting an ammonium cation, and * denoting a bond position with another partial structure constituting the polyester resin).

Formulas 1 and 2 will be described in greater detail below.

Each of $L^1$ in formula 1 and $L^2$ in formula 2 independently denotes a divalent connecting group. Examples of divalent connecting groups are divalent connecting groups comprising one member, or a combination of two or more members, selected from the group consisting of alkylene groups optionally containing linear, branched, or cyclic structures, alkenylene groups optionally containing linear, branched, or cyclic structures, aromatic groups, —C(=O)—, and —O—. The aromatic group can optionally contain hetero atoms, and desirably does not contain aromatic groups (that is, is an arylene group). Desirable examples of divalent connecting groups are alkylene groups having 1 to 10 carbon atoms, alkenylene groups having 2 to 10 carbon atoms, and aromatic groups having 6 to 12 carbon atoms. Preferred examples of divalent connecting groups are alkylene groups having 1 to 10 carbon atoms and aromatic groups having 6 to 12 carbon atoms. Examples of divalent connecting groups of even greater preference are alkylene groups having 1 to 5 carbon atoms, cycloalkylene groups having 6 to 10 carbon atoms, and arylene groups having 6 to 12 carbon atoms.

Each of $Z^1$ in formula 1 and $Z^2$ in formula 2 independently denotes a monovalent group denoted by —OM or a monovalent group denoted by —O$^-$A$^+$.

In —OM, M denotes a hydrogen atom or an alkali metal atom. Examples of alkali metal atoms are sodium atoms and potassium atoms. The monovalent group denoted by —OM is desirably —OH (that is, a hydroxyl group), —ONa, or —OK, with —OH or —ONa being preferred.

In —O$^-$A$^+$, A$^+$ denotes an ammonium cation. In —O$^-$A$^+$, the oxygen anion and the ammonium cation denoted by A$^+$ bond through an ionic bond to form a salt. The ammonium cation can be denoted by N$^+$(R$^1$)$_4$. In N$^+$(R$^1$)$_4$, each of the four instances of R$^1$ that are present independently denotes a hydrogen atom or a hydrocarbon group. When the ammonium cation is an organic ammonium cation, at least one of the four instances of R$^1$ that are present denotes a hydrocarbon group. The hydrocarbon group is desirably an alkyl group. The alkyl group can be a linear, branched, or cyclic alkyl group. A linear alkyl group is desirable. The number of carbon atoms in the alkyl group is, for example, 1 to 10, desirably 1 to 6. The four instances of R$^1$ that are present can be identical, partially, or completely different. In N$^+$(R$^1$)$_4$, all four instances of R$^1$ that are present can be hydrogen atoms, or all four can be hydrocarbon groups. In N$^+$(R$^1$)$_4$, 1 to 3 of the instances of R$^1$ can be hydrocarbon groups, with the instances of R$^1$ that are not hydrocarbon groups desirably being hydrogen atoms.

In one embodiment, the concentration of the monovalent group denoted by —OM (where M denotes an alkali metal atom) of the above polyester resin desirably falls within a range of 100 eq/ton to 1,000 eq/ton, preferably within a range of 200 eq/ton to 500 eq/ton. The concentration of the above monovalent group can be determined from the composition if the composition of the polymerizable composition employed to obtain the above polyester resin is known. It can also be determined by a known measurement method such as atomic absorption analysis. There are also cases where the monovalent group that is denoted by —OM (where M denotes an alkali metal atom) is contained in a moiety other than the partial structure denoted by formula 1 or formula 2 in the polyester resin.

The symbol * denotes the position of the bond between the above partial structure and the other partial structure constituting the above polyester resin. The partial structure that is denoted by formula 1 or the partial structure that is denoted by formula 2 can be contained as a side chain or on the end of the polyester resin, and is desirably contained on at least the end thereof. One or more, desirably 2 or more, of the partial structures selected from the group consisting of the partial structure denoted by formula 1 and the partial structure denoted by formula 2 are contained per molecule of polyester resin.

When the above polyester resin contains a partial structure containing a hydroxyl group, the acid value that is specified by JIS K 2501 (2003) can serve as an indicator of the content of the partial structure. When the polyester resin contains a partial structure having a hydroxyl group, the acid value desirably falls within a range of 3 KOH mg/g to 50 KOH mg/g, preferably within a range of 5 KOH mg/g to 50 KOH mg/g. The term "partial structure containing a hydroxyl group" is a partial structure selected from the group consisting of partial structures where $Z^1$ in formula 1 is a monovalent group (that is, a hydroxyl group) denoted by —OM (where M denotes a hydrogen atom) and partial structures where $Z^2$ in formula 2 denotes a hydroxyl group. As defined in JIS K 2501 (2003), the tell "acid value" is the number of milligrams (mg) of potassium hydroxide (KOH) required to neutralize the acid component contained in 1 g of sample.

The above polyester resin can contain one type of partial structure, or two or more differing types of partial structure, selected from the group consisting of partial structures denoted by formula 1 and partial structures denoted by formula 2.

Specific examples of the above polyester resin are the various polyester resins given by way of example in Examples further below.

<Method of Synthesizing Polyester Resin>

The above polyester resin can be synthesized by a known polyester synthesis method. Synthesis can normally be conducted in the presence of a polyester synthesis-use catalyst in the form of a known catalyst. Reference can be made to Examples set forth further below for known reaction conditions that can be adopted as the reaction conditions for the polyester synthesis reaction.

The partial structures denoted by formula 1 and the partial structures denoted by formula 2 can be introduced into a polyester resin obtained by polycondensation of a polyvalent carboxylic acid and a polyol, or can be introduced into any of the components contained in the polymerizable composition for synthesizing the polyester resin. A polyester resin having the above partial structure containing a desired polar group can be obtained by ion exchange by a known method after introducing the above partial structure. The partial structure denoted by formula 1 and the partial structure denoted by formula 2 are desirably introduced by acid modification using an acid anhydride when being incorporated into a polyester resin that has been obtained by the polycondensation of a polyvalent carboxylic acid and a polyol. For example, the acid modification, with an acid anhydride, of a polyester diol that has been obtained by polycondensation of a polyvalent carboxylic acid and a polyol permits the introduction of the partial structure denoted by formula 1 and/or the partial structure denoted by formula 2 on one or both ends, desirably both ends, of a polyester resin of linear structure by acid modification.

Specific examples of acid anhydrides are given below. However, there is no limitation to the acid anhydrides given by way of example below. The acid anhydride can be suitably selected for use based on the type of partial structure that is to be introduced into the polyester resin. Known reaction conditions can be adopted as the reaction conditions for acid modification with the acid anhydride. The reaction can also be conducted in the presence of a known catalyst. Reference can be made to Examples further below for specific examples of reaction conditions.

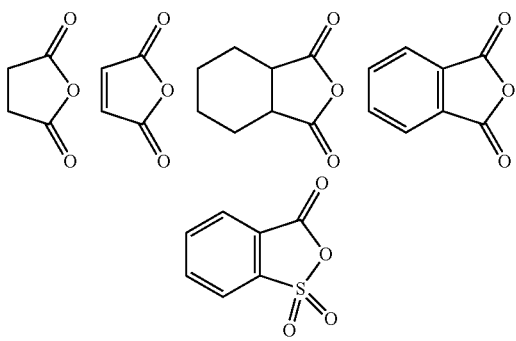

However, the synthesis method set forth above is an example, and does not limit the present invention in any way.

<Content of the Polyester Resin>

From the perspective of enhancing dispersion of the ferromagnetic powder and enhancing durability, it is desirable for greater than or equal to 0.5 weight part, preferably greater than or equal to 1.0 weight part, of the polyester resin to be contained per 100.0 weight parts of ferromagnetic powder in the magnetic layer. To increase the recording density, it is desirable to increase the fill rate of ferromagnetic powder in the magnetic layer. From this perspective, it is desirable to keep the content of components other than ferromagnetic powder relatively low. From this perspective, the content of the above polyester resin is desirably less than or equal to 50.0 weight parts, preferably less than or equal to 40.0 weight parts, and more preferably, less than or equal to 30.0 weight parts, per 100.0 weight parts of ferromagnetic powder. The same applies to the content of polyester resin in the magnetic recording medium composition according to an aspect of the present invention.

<Fatty Acid Ester>

The above magnetic recording medium contains a fatty acid ester in the magnetic layer. One or more types of fatty acid esters can be contained in the magnetic layer. Examples of fatty acid esters are esters of lauric acid, myristic acid, palmitic acid, stearic acid, oleic acid, linoleic acid, linolenic acid, behenic acid, erucic acid, and elaidic acid. Specific examples are: butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester, as the content of fatty acid ester in the magnetic layer-forming composition, can be, for example, 0.1 to 10.0 weight parts, desirably 0.5 to 8.0 weight parts, and preferably, 1.0 to 7.0 weight parts, per 100.0 weight parts of ferromagnetic powder.

When a nonmagnetic layer is present between the nonmagnetic support and magnetic layer of the above magnetic recording medium, the content of fatty acid ester in the nonmagnetic layer-forming composition is, for example, 0 to 10.0 weight parts, desirably 0.1 to 8.0 weight parts, per 100.0 weight parts of nonmagnetic powder. In a magnetic recording medium having a nonmagnetic layer between the nonmagnetic support and magnetic layer, the nonmagnetic layer can play the role of holding and supplying lubricant such as fatty acid ester to the magnetic layer. The fatty acid ester that is contained in the nonmagnetic layer can migrate to the magnetic layer and can be present in the magnetic layer. The same applies to other lubricants.

<Other Lubricants>

The above magnetic recording medium contains a lubricant in the form of a fatty acid ester in the magnetic layer. One or more lubricants other than fatty acid esters can also be contained in the magnetic layer and/or a nonmagnetic layer that is optionally provided. An example of an optionally contained lubricant is a fatty acid. Another example is a fatty acid amide. Although fatty acid esters are said to be components that function as fluid lubricants, fatty acids and fatty acid amides are said to be components that can function as boundary lubricants. Boundary lubricants are thought to be lubricants that adsorb to the surface of powder (such as ferromagnetic powder) and form strong lubricant films that reduce contact friction.

Examples of fatty acids are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. The fatty acid can be contained in the magnetic layer and/or nonmagnetic layer in the form of a salt such as a metal salt.

Examples of fatty acid amides are amides of the various fatty acids set forth above, such as amide laurate, amide myristate, amide palmitate, and amide stearate.

For fatty acids and derivatives of fatty acids (esters, amides, and the like), the fatty acid derivation site of the fatty acid derivative desirably has a structure that is identical or similar to the fatty acid in combination with which it is being employed. For example, when employing a fatty acid in the form of stearic acid, it is desirable to employ a stearic acid ester and/or a amide stearate.

The content of fatty acid in the magnetic layer-forming composition is, for example, 0 to 10.0 weight parts, desirably 0.1 to 10.0 weight parts, preferably 0.5 to 8.0 weight parts, and more preferably, 1.0 to 7.0 weight parts, per 100.0 weight parts of ferromagnetic powder. The content of fatty acid amide in the magnetic layer-forming composition is, for example, 0 to 3.0 weight parts, desirably 0 to 2.0 weight parts, and preferably, 0 to 1.0 weight parts, per 100.0 weight parts of ferromagnetic powder.

When a nonmagnetic layer is present between the nonmagnetic support and magnetic layer of the above magnetic recording medium, the content of fatty acid in the nonmagnetic layer-forming composition is, for example, 0 to 10.0 weight parts, desirably 1.0 to 10.0 weight parts, and preferably, 1.0 to 7.0 weight parts, per 100.0 weight parts of nonmagnetic powder. The content of fatty acid amide in the nonmagnetic layer-forming composition is, for example, 0 to 3.0 weight parts, desirably 0 to 1.0 weight parts, per 100.0 weight parts of nonmagnetic powder.

<Ferromagnetic Powder>

In addition to the various components set forth above, the above magnetic recording medium contains ferromagnetic powder in the magnetic layer. The ferromagnetic powder desirably has an average particle size of less than or equal to 50 nm. Ferromagnetic powder having an average particle size of less than or equal to 50 nm is capable of responding to the high density recording that has been demanded in recent years. However, it is not easy to enhance the dispersion thereof. By contrast, employing the above polyester resin in combination makes it possible to enhance the dispersion of ferromagnetic powder having an average particle size of less than or equal to 50 nm. From the perspective of the stability of magnetization, an average particle size of greater than or equal to 10 nm is desirable and greater than or equal to 20 nm is preferred.

Hexagonal ferrite powder is a specific example of desirable ferromagnetic powder. From the perspectives of achieving higher density recording and magnetization stability, the average particle (for example, average plate diameter) of hexagonal ferrite powder desirably ranges from 10 nm to 50 nm, preferably 20 nm to 50 nm. Reference can be made to Japanese Unexamined Patent Publication (KOKAI) No. 2011-216149, paragraphs 0134 to 0136, for details on hexagonal ferrite powder. The content of the above publication is expressly incorporated herein by reference in its entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, for details on ferromagnetic metal powder.

The content (fill rate) of the ferromagnetic powder in the magnetic layer desirably falls within a range of 50 to 90 weight %, preferably within a range of 60 to 90 weight %. It is desirable for the fill rate to be high from the perspective of increased recording density.

<Binder>

The above magnetic recording medium contains binder in the magnetic layer in addition to the components described above. Various resins that are commonly employed as binders in particulate magnetic recording media can be employed without limitation as the binder. The binder employed can be in the form of polyurethane resin, vinyl chloride resin, polyester resin other than the above polyester resin, polyamide resin, copolymerized acrylic resins of styrene, acrylonitrile, methyl methacrylate and the like; nitrocellulose and other cellulose resins; epoxy resin; phenoxy resin; polyvinyl acetal, polyvinyl butyral, and other polyvinyl alkyrals; these resins can be employed singly or two or more resins can be mixed for use. Of these, polyurethane resins, vinyl chloride resins, acrylic resins and cellulose resins are desirable, and polyurethane resins and vinyl chloride resins are preferable from the perspective of compatibility with the above polyester resin. These resins can also be employed as binders in the nonmagnetic layer and backcoat layer, described further below.

Reference can be made to Japanese Unexamined Patent Publication (KOKAI) No. 2010-24113, which is expressly incorporated herein by reference in its entirety, paragraphs 0028 to 0031, with regard to the binders. The binder content, for example, falls within a range of 5.0 to 50.0 weight parts, desirably falls within a range of 10.0 to 30.0 weight parts, per 100.0 weight parts of ferromagnetic powder.

The weight average molecular weight of the binder desirably falls within a range of 20,000 to 120,000, preferably within a range of 30,000 to 100,000, and more preferably, within a range of 30,000 to 60,000. By contrast, the polyester resin that has been described in detail above has a lower molecular weight than the powder that is normally employed as binder.

<Other Components>

In addition to the various components set forth above, additives can be contained as needed in the magnetic layer of the above magnetic recording medium. Examples of additives are the various additives commonly employed to form particulate magnetic recording media, such as abrasives, dispersing agents, dispersing adjuvants, antifungal agents, antistatic agents, oxidation inhibitors, and carbon black. The additives can be suitably selected for use from among commercial products based on desired properties. In the magnetic recording medium according to an aspect of the present invention, the above polyester resin can function as a dispersing agent.

The above magnetic layer can be formed with a magnetic layer-forming composition which contains a known curing agent. A magnetic layer formed using a magnetic layer-forming composition containing a curing agent will normally contain a reaction product in which the component (such as binder) and curing agent are crosslinked. Polyisocyanate is desirably employed as a curing agent. Reference can be made to Japanese Unexamined Patent Publication (KOKAI) No. 2011-216149, paragraphs 0124 and 0125 for details relating to polyisocyanate. The curing agent is employed, for example, in a proportion of 0 to 80.0 weight parts in a magnetic layer-forming composition, and the curing agent is desirably added in a quantity of 50.0 to 80.0 weight parts, per 100.0 weight parts of binder in a magnetic layer-forming composition.

<Preparation of Magnetic Layer-Forming Composition>

The above magnetic layer can be formed using a magnetic layer-forming composition containing the various components set forth above. The magnetic layer-forming composition normally contains solvent. Examples of solvent are the organic solvents that are commonly employed to manufacture particulate magnetic recording media. Specific examples that can be used in any ratio are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methyl cyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethyl formamide; hexane; and the like. The quantity of solvent in the magnetic layer-forming composition can be identical to that in the magnetic layer-forming composition of a common particulate magnetic recording medium.

The magnetic layer-forming composition can be prepared by sequentially admixing, either simultaneously or in any order, the various components that have been set forth above. The method of preparing the composition is not specifically limited. Known techniques relating to the preparation of magnetic layer-forming compositions for particulate magnetic recording media can be applied without limitation.

<Configuration and Manufacturing Process of Magnetic Recording Medium>

The configuration and manufacturing process of the above magnetic recording medium will be described in greater detail below.

(Magnetic Layer)

The magnetic layer can be formed by applying and drying the magnetic layer-forming composition, either directly, or on the surface of another layer such as a nonmagnetic layer that has been provided, on the surface of a nonmagnetic support, and conducting treatments such as heating as needed. The various components that are contained in the magnetic layer and the composition that is used to form the magnetic layer are as set forth above.

(Nonmagnetic Layer)

Details of the nonmagnetic layer will be described next.

In the above magnetic recording medium, a nonmagnetic layer containing nonmagnetic powder and binder can be present between the nonmagnetic support and the magnetic layer. Either inorganic substances or organic substances can be employed as the nonmagnetic powder in the nonmagnetic layer. Carbon black can also be employed. Examples of inorganic substances are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details in this regard.

Known techniques with regard to the binder, additives and the like of the nonmagnetic layer can be applied to the nonmagnetic layer. Techniques that are known with regard to the magnetic layer can be applied to the quantity and type of binder and the quantities and types of additives that are added. Details of the lubricants that can be contained in the nonmagnetic layer are as set forth above.

The nonmagnetic layer in the present invention and the present specification includes an essentially nonmagnetic layer containing trace quantities of ferromagnetic powder, for example, either as impurities or intentionally, in addition to the nonmagnetic powder. The essentially nonmagnetic layer means a layer exhibiting a residual magnetic flux density of equal to or less than 10 mT or a coercive force of equal to or less than 7.96 kA/m (100 Oe), or a residual magnetic flux density of equal to or less than 10 mT and a coercive force of equal to or less than 7.96 kA/m (100 Oe). The nonmagnetic layer desirably has no residual magnetic flux density or coercive force.

(Nonmagnetic Support)

Details of the nonmagnetic support (also simply referred to as the "support", hereinafter) will be described next. Examples of nonmagnetic supports are known supports such as biaxially stretched polyethylene terephthalate, polyethylene naphthalate, polyamide, polyamide-imide, and aromatic polyamide. Of these, polyethylene terephthalate, polyethylene naphthalate, and polyamide are desirable.

These supports can be subjected to corona discharge, plasma treatment, adhesion-enhancing treatment, and heat treatment in advance.

(Layer Structure)

With regard to the thickness of the nonmagnetic support and each layer in the magnetic recording medium, the thickness of the nonmagnetic support desirably ranges from 3.0 μm to 80.0 μm. The thickness of the magnetic layer can be optimized for the magnetization saturation and head gap length of the magnetic head employed, the bandwidth of the recording signal, and the like, and is generally 10 nm to 150 nm, desirably 20 nm to 120 nm, preferably 30 nm to 100 nm. It suffices for the magnetic layer to be comprised of at least one layer, and it can be separated into two or more layers of differing magnetic characteristics. A structure relating to a known multilayer magnetic layer can be applied. In the case of a multilayer magnetic layer, the thickness of the magnetic layer refers to the combined thickness of the multiple magnetic layers.

The thickness of the nonmagnetic layer is, for example, 0.1 μm to 3.0 μm, desirably 0.1 μm to 2.0 μm, and preferably 0.1 μm to 1.5 μm.

(Backcoat Layer)

In the above magnetic recording medium, a backcoat layer can be provided on the opposite surface of the nonmagnetic support from the surface on which the magnetic layer is present. The backcoat layer desirably contains carbon black and/or inorganic powder. The formula of the magnetic layer and/or nonmagnetic layer can be applied to the binder and various additives for forming the backcoat layer. The backcoat layer is desirably equal to or less than 0.9 μm, preferably 0.1 μm to 0.7 μm in thickness.

(Manufacturing Steps)

The process of manufacturing compositions for forming the magnetic layer, nonmagnetic layer, and backcoat layer normally includes at least a kneading step, dispersing step, and a mixing step, provided as needed before and/or after these steps. Each of these steps can be divided into two or more stages. All of the starting materials employed can be added either at the start of, or part way through, any step. Any of the starting materials can be divided up and added in two or more steps. For example, binder can be divided up and added in the kneading step, dispersing step, and in a mixing step after the dispersing step for viscosity adjustment. To manufacture the above magnetic recording medium, conventionally known manufacturing techniques can be employed. A device with powerful kneading strength such as an open kneader, continuous kneader, pressure kneader, extruder, or the like is desirably employed in the kneading step. These kneading treatments are described in Japanese Unexamined Patent Publication (KOKAI) Heisei Nos. 1-106338 and 1-79274, which are expressly incorporated herein by reference in their entirety. Glass beads or some other beads can be employed to disperse a composition for forming each layer. Dispersion beads of high specific gravity in the form of zirconia beads, titanium beads, or steel balls are suitable as such dispersion beads. These dispersion beads can be employed by optimizing their particle diameters and fill rates. A known dispersing apparatus can be employed. Reference can be made to Japanese Unexamined Patent Publication (KOKAI) No. 2010-24113, paragraphs 0051 to 0057, for details regarding methods of manufacturing magnetic recording media.

[Magnetic Recording Medium Composition]

An aspect of the present invention relates to a magnetic recording medium composition, a composition for a magnetic recording medium, containing ferromagnetic powder, binder, a fatty acid ester, and the polyester resin described in detail above. Details regarding the above magnetic recording medium composition are as set forth above for the magnetic recording medium according to an aspect of the present invention and the magnetic layer-forming composition used to form it.

The above magnetic recording medium composition can be a single liquid type composition in which all components are mixed, or a multiple liquid type composition of two or more liquid types in which multiple liquids are mixed to form the magnetic layer.

The magnetic recording medium according to an aspect of the present invention that has been set forth above can achieve both enhanced dispersion of ferromagnetic powder and enhanced durability. The magnetic recording medium composition according to an aspect of the present invention can be employed as the magnetic layer-forming composition for such a magnetic recording medium.

EXAMPLES

The present invention is described more specifically through Examples given below. However, the present invention is not limited by the embodiments given in Examples. Unless specifically stated otherwise, the "parts" and "%"

that are given below are based on weight. The room temperature referred to below is an atmospheric temperature of about 20° C. to 25° C.

The weight average molecular weights given below were obtained by conducting measurement under the measurement conditions set forth above by GPC and calculating the value as a polystyrene-converted value.

The concentration (see Table 2) of the monovalent group where M denotes a sodium atom (Na) in the monovalent group denoted by —OM (that is, —ONa) was calculated based on the Na concentration obtained by atomic absorption analysis after carbonizing and dissolving in acid a 0.1 g quantity of sample.

The acid value (see Table 2) was measured in accordance with JIS K 2501 (2003).

[Synthesis of Polyester Diol (A-1)]

To a 300 mL three-necked flask were charged 83.1 parts of terephthalic acid, 9.3 parts of ethylene glycol, and 26.6 parts of propylene glycol. To this was added 0.3 part of tetrabutoxytitanate as a catalyst. Under a nitrogen flow, the mixture was reacted for about 8 hours at a liquid temperature of 220° C., and the water generated was distilled off. A reduced pressure treatment was conducted for about 5 minutes at the same temperature, and the reaction was ended. The product was cooled to room temperature, yielding 119 g of polyester diol (A-1). The composition of the polymerizable composition employed to synthesize polyester diol (A-1) is given in Table 1.

[Synthesis of Acid-Modified Polyester (B-1)]

In a 300 mL three-necked flask, 100 parts of polyester diol (A-1) were dissolved in 100 parts of methyl ethyl ketone; the mixture was stirred and dissolved at a liquid temperature of 80° C. while nitrogen was blown in. To this were added 4.0 parts of succinic anhydride and 0.05 part of catalyst in the form of 4-dimethylaminopyridine, and the mixture was reacted for 5 hours at a liquid temperature of 80° C. The disappearance of the starting materials (succinic anhydride) was confirmed by $^1$H-NMR, after which the mixture was cooled to room temperature to obtain acid-modified polyester (B-1). The number average molecule weight and acid number of acid-modified polyester (B-1) are given in Table 2.

[Synthesis of Polyester Diols (A-2) to (A-8)]

The composition of the polymerizable compositions used to synthesize polyester diols (A-2) to (A-8) are given in Table 1. With the exception that the composition of the polymerizable composition was changed, polyester diols (A-2) to (A-8) were synthesized by the same method as in the synthesis of polyester diol (A-1).

[Synthesis of Acid-Modified Polyesters (B-4) to (B-15)]

With the exception that the polyester diol shown in Table 2 was modified with the type and quantity of acid anhydride indicated in Table 2, acid-modified polyesters (B-4) to (B-15) were synthesized by the same method as in the synthesis of acid-modified polyester (B-1). The number average molecular weights and acid values of acid-modified polyesters (B-4) to (B-15) are given in Table 2.

[Synthesis of Acid-Modified Polyesters (B-2)]

An 8.0 mL quantity of a 5 mol % methanol solution of sodium methoxide was added to 204 g of a solution obtained by the same method as in the synthesis of acid-modified polyester (B-1), and acid-modified polyester (B-2) was obtained. The number average molecular weight and acid value of acid-modified polyester (B-2) are given in Table 2.

[Synthesis of Acid-Modified Polyesters (B-3)]

A 4.1 g quantity of triethylamine was added to 204 g of a solution obtained by the same method as in the synthesis of acid-modified polyester (B-1), and acid-modified polyester (B-3) was obtained. The number average molecular weight and acid value of acid-modified polyester (B-3) are given in Table 2.

TABLE 1

| | | Example (unit: parts) | | | | | | | |
|---|---|---|---|---|---|---|---|---|---|
| | | A-1 | A-2 | A-3 | A-4 | A-5 | A-6 | A-7 | A-8 |
| Polyvalent carboxylic acid | TPA | 83.1 | | | | | | | |
| | PA | | 83.1 | | 83.1 | 83.1 | 51.5 | 74.8 | |
| | AA | | | | | | 27.8 | | 73.1 |
| | HPA | | | 86.1 | | | | | |
| | SIPA | | | | | | | 13.4 | |
| Polyol | EG | 9.3 | 13.7 | 9.3 | | 7.4 | 7.4 | 24.2 | 9.3 |
| | PG | 26.6 | | 26.6 | | | | | 26.6 |
| | DEG | | | | | | | | |
| | NPG | | 29.2 | | | | 29.2 | | |
| | BPA | | | | | 13.7 | | | |
| | TEG | | | | 75.1 | 48.1 | | 16.5 | |

(Polyvalent carboxylic acid)
TPA: Terephthalic acid;
PA: phthalic acid;
AA: Adipic acid;
HPA: cis-1,2-cyclohexane dicarboxylic acid;
SIPA: 5-sulfoisophthalic acid
(Polyol)
EG: Ethylene glycol;
PG: propylene glycol;
DEG: diethylene glycol;
NPG: neopentyl glycol;
BPA: bisphenol A;
TEG: triethylene glycol

[Preparation of Magnetic Recording Medium Composition and Fabrication of Magnetic Recording Medium (Magnetic Tape)]

<Preparation of Magnetic Recording Medium Composition (Magnetic Layer-Forming Composition)>

(Formula of Composition)

| | |
|---|---|
| Plate-like ferromagnetic hexagonal ferrite powder: | 100.0 parts |
| Composition other than oxygen (molar ratio): | |
| Ba/Fe/Co/Zn = 1/9/0.2/1 | |
| Coercive force Hc: 160 kA/m (2,000 Oe) | |
| Average particle size (average plate diameter): 20 nm | |
| Average plate ratio: 2.7 | |
| Brunauer-Emmett-Teller (BET) specific surface area: 60 m$^2$/g | |
| Saturation magnetization σs: 46 A · m$^2$/kg (46 emu/g) | |
| Polyester resin (see Table 2) synthesized above: | 3.0 parts |
| Polyurethane resin (Vylon (Japanese registered trademark) UR4800, SO$_3$Na concentration: 70 eq/ton; weight average molecular weight: 70,000, made by Toyobo): | 4.0 parts |
| Vinyl chloride resin (MR104 made by Kaneka, weight average molecular weight 55,000): | 10.0 parts |
| α-Al$_2$O$_3$ (average particle size: 0.1 μm): | 8.0 parts |
| Carbon black (average particle size: 0.08 μm): | 0.5 part |
| Cyclohexanone: | 110.0 parts |

(Preparation of Composition)

The various above components were kneaded in an open kneader and then dispersed using a sand mill. The following components were added to the dispersion obtained. The mixture was stirred, ultrasonically processed, and filtered with a filter having an average pore diameter of 1 μm to obtain a magnetic recording medium composition.

| | |
|---|---|
| Butyl stearate: | 1.5 parts |
| Stearic acid: | 0.5 part |

-continued

| | |
|---|---|
| Amide stearate: | 0.2 Part |
| Methyl ethyl ketone: | 50.0 parts |
| Cyclohexanone: | 50.0 parts |
| Toluene: | 3.0 parts |
| Polyisocyanate compound (Coronate 3041, made by Nippon Polyurethane Industry Co., Ltd.): | 2.5 parts |

<Fabrication of Magnetic Tape>
(Preparation of Nonmagnetic Layer-Forming Composition)

| | |
|---|---|
| Nonmagnetic powder ($\alpha Fe_2O_3$ hematite):<br>Average particle size (average major axis length): 0.15 μm<br>BET specific surface area: 52 m$^2$/g<br>pH:6<br>Tap density: 0.8<br>Dibutyl phthalate (DBF) oil absorption capacity: 27 to 38 g/100 g<br>Surface treatment agents: $Al_2O_3$ and $SiO_2$ | 80.0 parts |
| Carbon black:<br>Average particle size: 0.020 μm<br>DBF oil absorption capacity: 80 mL/100 g<br>pH: 8.0<br>BET specific surface area: 250 m$^2$/g<br>Volatile component: 1.5% | 20.0 parts |
| Polyurethane resin:<br>Branched side chain-containing polyester polyol/diphenylmethane diisocyanate $SO_3Na$ concentration: 100 eq/ton | 19.0 parts |
| Methyl ethyl ketone: | 150.0 parts |
| Cyclohexanone: | 150.0 parts |

The various above components were kneaded in an open kneader and then dispersed with a sand mill. The following components were added to the dispersion obtained. The mixture was then stirred and filtered with a filter having an average pore diameter of 1 μm to prepare a nonmagnetic layer-forming composition.

Butyl stearate: 1.5 parts
Stearic acid: 1.0 part
Methyl ethyl ketone: 50.0 parts
Cyclohexanone: 50.0 parts
Toluene: 3.0 parts
Polyisocyanate compound (Coronate 3041 made by Nippon Polyurethane Industry Co., Ltd.): 5.0 parts
(Preparation of Backcoat Layer-Forming Composition)

| | |
|---|---|
| Carbon black (average particle size: 40 nm): | 85.0 parts |
| Carbon black (average particle size: 100 nm): | 3.0 parts |
| Nitrocellulose: | 28.0 parts |
| Polyurethane resin: | 58.0 parts |
| Copper phthalocyanine dispersing agent | 2.5 parts |
| Nipporan 2301 (made by Nippon Polyurethane Industry Co., Ltd.) | 0.5 part |
| Methyl isobutyl ketone: | 0.3 part |
| Methyl ethyl ketone: | 860.0 parts |
| Toluene: | 240.0 parts |

The above components were prekneaded in a roll mill and then dispersed in a sand mill. To the dispersion were added 4.0 parts of polyester resin (Vylon 500 made by Toyobo), 14.0 parts of polyisocyanate compound (Coronate 3041 made by Nippon Polyurethane Industry Co., Ltd.), and 5.0 parts of $\alpha$-$Al_2O_3$ (made by Sumitomo Chemical Co., Ltd.). The mixture was stirred and filtered to prepare a backcoat layer-forming composition.
(Preparation of Magnetic Tape)
Both surfaces of a polyethylene naphthalate support 5 μm in thickness were subjected to a corona discharge treatment. The above nonmagnetic layer-forming composition was coated on one surface of the polyethylene naphthalate support in a quantity calculated to yield a thickness upon drying of 1.0 μm. Immediately thereafter, the magnetic layer-forming composition was simultaneously multilayer coated in a quantity calculated to yield a magnetic layer thickness upon drying of 100 nm. While the two layers were still wet, a vertical orientation treatment was conducted with a cobalt magnetic having a coercive force of 0.5 T (5,000 G) and a solenoid having a coercive force of 0.4 T (4,000 G), after which the coatings were subjected to a drying treatment.

Subsequently, the above backcoat layer-forming composition was coated in a quantity calculated to yield a thickness upon drying of 0.5 μm on the other surface of the same polyethylene naphthalate support. Next, a calender treatment was conducted at a speed of 80 m/min and a surface temperature of the calender rolls of 100° C. in a 7-stage calender comprised solely of metal rolls. The product was then slit to ½ inch (0.0127 meter) width to fabricate a magnetic tape.

[Methods of Evaluating Magnetic Tapes]
(Evaluation of Dispersion of Ferromagnetic Powder Based on Vertical Squareness Ratio)

The vertical squareness ratio (SQ) of the various magnetic tapes that had been fabricated was measured at a magnetic field strength of 1,194 kA/m (15 kOe) with a vibrating sample magnetometer (made by Toei-Kogyo Co., Ltd.). The higher the dispersion of the ferromagnetic powder in the magnetic layer, the greater the value of the vertical squareness ratio that can be achieved by the above vertical orientation processing. Accordingly, the vertical squareness ratio that was measured here can be an indicator of dispersion of the ferromagnetic powder in the magnetic layer. The higher the value, the better the dispersion evaluation. Generally, a difference of 0.01 in vertical squareness ratio is said to correspond to a difference of 0.1 dB in the signal-to-noise ratio (SNR), an indicator of electromagnetic characteristics. From the perspective of enhancing the electromagnetic characteristics, an improvement in the vertical squareness ratio of greater than or equal to 0.01 is desirable.

(Durability (Scratch-Resistance) Evaluation)
The surface of the magnetic layer was contacted with a glass dummy head which had a cross sectional area of 7 mm×7 mm and a 500 m length of magnetic tape was run back and forth 10 times under conditions of a head lap angle of 2° relative to the glass dummy head, a running speed of 4.8 m/min, a winding tension of 80 gf (about 0.785 Newtons (N)), and a winding touch pressure of 1.0 kg. Subsequently, the contact surface of the glass dummy head with the magnetic tape was observed under an optical microscope and the amount of grime adhering (adhesion surface area) was evaluated. The grime that was evaluated by this method was primarily generated by shaving of the surface of the magnetic layer. The lower the value of the amount of head grime evaluated, the less prone the surface of the magnetic layer was to shaving and the better the magnetic tape durability (more particularly, the scratch resistance of the magnetic layer) indicated.

The spacing on the surface of the magnetic layer was measured by the following method with a tape spacing analyzer (TSA, made by Micro Physics Corp.).

With a glass sheet which was equipped in the TSA was disposed on the surface of the magnetic layer of the magnetic tape, a urethane half-sphere which was equipped in the TSA was employed as a pressing member. This half-sphere was pressed down at a pressure of $5.05\times10^4$ N/m (0.5 atm) on the surface of the backcoat layer of the magnetic tape. In that state, white light was irradiated onto a prescribed region (150,000 to 200,000 μm$^2$) of the surface of the magnetic layer of the magnetic tape through the glass sheet from a stroboscope which was equipped in the TSA. The reflected light passed through an interference filter (a filter selectively passing light with a wavelength of 633 nm) onto a charge-coupled device (CCD), where it was received. An interference fringe produced by indentations and protrusions in this region was thus obtained.

This image was divided into 300,000 points. The distance from the surface of the glass sheet on the magnetic tape side to the surface of the magnetic layer of the magnetic tape was determined for each point. These were adopted as a histogram. The most frequent value of the histogram is given in Table 2 as the TSA spacing. The TSA spacing can be used as an indicator of the thickness of the liquid film of fatty acid ester present on the surface of the magnetic layer.

Table 2 gives the results of the above. Table 2 also gives details regarding the polyester resins employed as magnetic layer components in Examples and Comparative Examples. For each of the polyester resins, the fact that the entire quantities of polyvalent carboxylic acid and polyol employed to synthesize the polyester diol had been consumed in the synthesis reaction was confirmed by $^1$H-NMR. Thus, the ratio of each structural unit was obtained from the composition of the polymerizable composition employed in synthesis. The fact that the hydroxyl groups on the two ends of each of the polyester dials were acid modified by the acid anhydride can be confirmed from the quantity of acid anhydride employed in the acid modification, from the fact that the entire quantity of acid anhydride employed in the acid modification was consumed by the acid modification, and from the acid value measurement results. Table 2 also gives the partial structures denoted by formulas 1 and 2 that were introduced to the various polyester resins by acid modification.

TABLE 2

| | Polyester resin (acid-modified polyester) | Polyester diol | Acid anhydride | | Partial structure introduced by acid modification | Number average molecular weight Mn |
|---|---|---|---|---|---|---|
| | | | Structural formula | Quantity added/parts (per 100 parts of polyester diol) | | |
| Ex. 1 | B-1 | —(O—CH₂CH₂—O)₁₅—(O—CH(CH₃)—CH₂—O)₃₅—(OC—C₆H₄—CO)₅₀— A-1 | succinic anhydride | 4.0 | *—O—CO—CH₂—CH₂—COOH | 6000 |
| Ex. 2 | B-2 | —(O—CH₂CH₂—O)₁₅—(O—CH(CH₃)—CH₂—O)₃₅—(OC—C₆H₄—CO)₅₀— A-1 | succinic anhydride | 4.0 | *—O—CO—CH₂—CH₂—COONa | 6000 |
| Ex. 3 | B-3 | —(O—CH₂CH₂—O)₁₅—(O—CH(CH₃)—CH₂—O)₃₅—(OC—C₆H₄—CO)₅₀— A-1 | succinic anhydride | 4.0 | *—O—CO—CH₂—CH₂—COO⁻ HN⁺(C₂H₅)₃ | 6000 |

TABLE 2-continued

| | | | | | |
|---|---|---|---|---|---|
| Ex. 4 | B-4 | [structure with H₃C-C(CH₃)-(OCH₂)₂₆ and (O)₂₂, A-2 phthaloyl ₅₀] | [succinic anhydride] | 4.8 | [*-O-C(=O)-CH₂-CH₂-C(=O)-OH] 5000 |
| Ex. 5 | B-5 | [CH₃-CH-(O)₃₅ / (O)₁₅, A-3 cyclohexane-1,2-dicarbonyl ₅₀] | [succinic anhydride] | 3.4 | [*-O-C(=O)-CH₂-CH₂-C(=O)-OH] 7000 |
| Ex. 6 | B-6 | [(O)₅₀ / (O)₅₀, A-4 phthaloyl ₅₀] | [succinic anhydride] | 3.4 | [*-O-C(=O)-CH₂-CH₂-C(=O)-OH] 7000 |
| Ex. 7 | B-7 | [(O)₁₂ / (O)₃₂, bisphenol-A (O)₁₆, A-5 phthaloyl ₅₀] | [succinic anhydride] | 4.0 | [*-O-C(=O)-CH₂-CH₂-C(=O)-OH] 6000 |

TABLE 2-continued

| | | | | | |
|---|---|---|---|---|---|
| Ex. 8 | B-8 | (structure with H₃C, CH₃, O₂₈, O₂₂, A-6 with ₁₈ and phthalate ₃₁) | (succinic anhydride) | 3.4 | (succinate half-ester, 7000) |
| Ex. 9 | B-9 | (structure with O₃₉, O₁₁, A-7 with ₅ and phthalate ₄₅, H₃C-SO₂-) | (succinic anhydride) | 8.0 | (succinate half-ester, 3000) |
| Ex. 10 | B-10 | (structure with O₃₉, O₁₁, A-7 with ₅ and phthalate ₄₅, H₃C-SO₂-) | (succinic anhydride) | 3.4 | (succinate half-ester, 10000) |

TABLE 2-continued
| | | | | | |
|---|---|---|---|---|---|
| Ex. 11 | B-11 |  | A-7 |  12.3 | 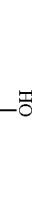 3000 |
| Ex. 12 | B-12 |  | A-7 |  11.8 |  3000 |
| Ex. 13 | B-13 |  | A-7 | 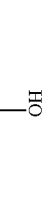 14.7 |  3000 |

TABLE 2-continued
| | | | | | | |
|---|---|---|---|---|---|---|
| Comp. Ex. 1 | — | None | 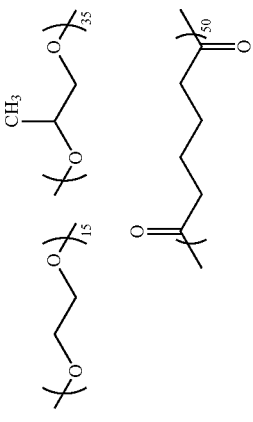 | None | None | — |
| Comp. Ex. 2 | B-14 |  | 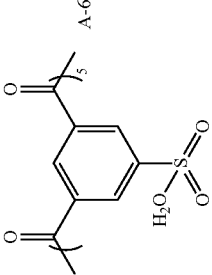 | 3.4 | 7000 |
| Comp. Ex. 3 | — | 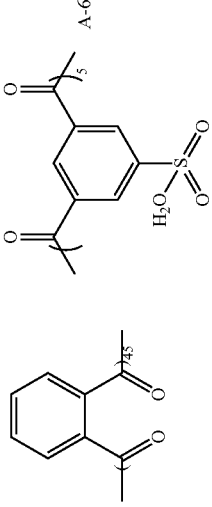 | 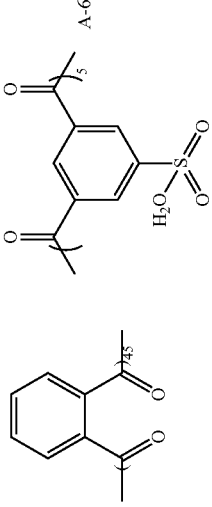 | — | — | 10000 |

TABLE 2-continued
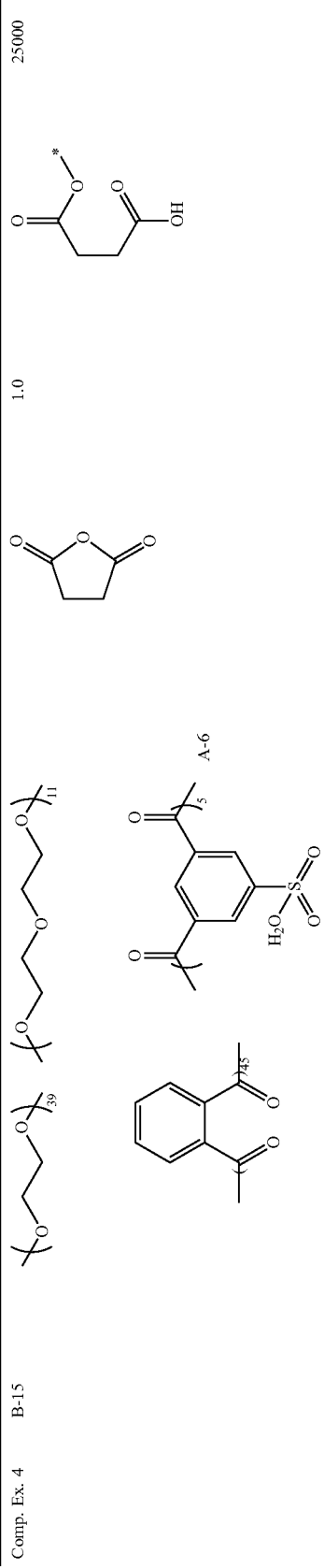
| | —ONa concentration sq/ton | Acid value KOHmg/g | Vertical SQ | Durability (amount of head grime nm²) | TSA spacing nm |
|---|---|---|---|---|---|
| Ex. 1 | — | 19 | 0.76 | 0.17 | 4.1 |
| Ex. 2 | — | <2 | 0.76 | 0.17 | 4.1 |
| Ex. 3 | — | <2 | 0.76 | 0.17 | 4.1 |
| Ex. 4 | — | 23 | 0.77 | 0.18 | 3.9 |
| Ex. 5 | — | 18 | 0.76 | 0.18 | 3.9 |
| Ex. 6 | — | 16 | 0.76 | 0.19 | 3.6 |
| Ex. 7 | — | 19 | 0.74 | 0.19 | 3.5 |
| Ex. 8 | — | 16 | 0.78 | 0.21 | 3.4 |
| Ex. 9 | 200 | 36 | 0.77 | 0.18 | 3.8 |
| Ex. 10 | 200 | 11 | 0.78 | 0.17 | 4.0 |
| Ex. 11 | 200 | 36 | 0.78 | 0.18 | 3.8 |
| Ex. 12 | 200 | 36 | 0.78 | 0.18 | 3.8 |
| Ex. 13 | 200 | 36 | 0.79 | 0.18 | 3.8 |
| Comp. Ex. 1 | — | — | 0.68 | 0.19 | 3.2 |
| Comp. Ex. 2 | — | 16 | 0.72 | 0.26 | 3.2 |
| Comp. Ex. 3 | 200 | <2 | 0.72 | 0.19 | 4.0 |
| Comp. Ex. 4 | 200 | <2 | 0.70 | 0.20 | 3.9 |

Based on the results given in Table 2, it can be confirmed that the magnetic tapes of Examples achieved both enhanced dispersion of ferromagnetic powder in the magnetic layer and enhanced durability.

Based on the evaluation results of the TSA spacing value and durability, a tendency for the durability to improve (for the amount of head grime to decrease) was observed based on the high TSA spacing value. The present inventors presume that these results show that the polyester resin employed as a magnetic layer component in Examples could exhibit the effect of increasing the thickness of the liquid film of fatty acid ester on the surface of the magnetic layer, thereby enhancing durability.

An aspect of the present invention is useful in the technical field of magnetic recording media for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic recording medium,
which comprises a magnetic layer comprising ferromagnetic powder and binder on a nonmagnetic support, wherein:
the magnetic layer further comprises a fatty acid ester and a polyester resin with a number average molecular weight of greater than or equal to 1,000 but less than 20,000;
the polyester resin comprises a structural unit derived from a polyvalent carboxylic acid and a structural unit derived from a polyol, as well as 10 mol % to 50 mol % of a structural unit, derived from a cyclic polyvalent carboxylic acid selected from the group consisting of an alicyclic polyvalent carboxylic acid and an aromatic polyvalent carboxylic acid, per 100 mol % of a combined total of the structural unit derived from the polyvalent carboxylic acid and the structural unit derived from the polyol; and
the polyester resin comprises one or more partial structures selected from the group consisting of a partial structure denoted by formula 1 and a partial structure denoted by formula 2 below:

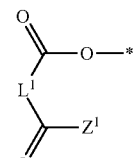

Formula 1

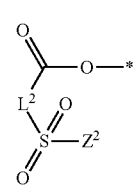

Formula 2 wherein each of $L^1$ in formula 1 and $L^2$ in formula 2 independently denotes a divalent connecting group, and each of $Z^1$ in formula 1 and $Z^2$ in formula 2 independently denotes a monovalent group denoted by —OM or a monovalent group denoted by —O$^-$A$^+$, with M denoting a hydrogen atom or an alkali metal atom, A$^+$ denoting an ammonium cation, and * denoting a bond position with another partial structure constituting the polyester resin.

2. The magnetic recording medium according to claim 1, wherein the divalent connecting group is an alkylene group having 1 to 10 carbon atoms, an alkenylene group having 2 to 10 carbon atoms, or an aromatic group having 6 to 12 carbon atoms.

3. The magnetic recording medium according to claim 1, wherein the divalent connecting group is an alkylene group having 1 to 10 carbon atoms.

4. The magnetic recording medium according to claim 1, wherein the divalent connecting group is an alkenylene group having 2 to 10 carbon atoms.

5. The magnetic recording medium according to claim 1, wherein the divalent connecting group is an aromatic group having 6 to 12 carbon atoms.

6. The magnetic recording medium according to claim 1, wherein the magnetic layer comprises 0.5 to 50.0 weight parts of the polyester resin per 100.0 weight parts of ferromagnetic powder.

7. The magnetic recording medium according to claim 1, wherein the binder is one or more resins selected from the group consisting of a polyurethane resin and a vinyl chloride resin.

8. The magnetic recording medium according to claim 1, wherein an average particle size of the ferromagnetic powder falls within a range of 10 nm to 50 nm.

9. The magnetic recording medium according to claim 1, wherein the polyester resin has a polycondensation structure of the polyvalent carboxylic acid and the polyol.

10. A composition,
which is a magnetic recording medium composition comprising ferromagnetic powder, binder, a fatty acid ester, and a polyester resin with a number average molecular weight of greater than or equal to 1,000 but less than 20,000, wherein:
the polyester resin comprises a structural unit derived from a polyvalent carboxylic acid and a structural unit derived from a polyol, as well as 10 mol % to 50 mol % of a structural unit, derived from a cyclic polyvalent carboxylic acid selected from the group consisting of an alicyclic polyvalent carboxylic acid and an aromatic polyvalent carboxylic acid, per 100 mol % of a combined total of the structural unit derived from the polyvalent carboxylic acid and the structural unit derived from the polyol; and the polyester resin comprises one or more partial structures selected from the group consisting of a partial structure denoted by formula 1 and a partial structure denoted by formula 2 below:

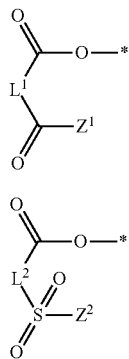

Formula 1

Formula 2 wherein each of $L^1$ in formula 1 and $L^2$ in formula 2 independently denotes a divalent connecting group, and each of $Z^1$ in formula 1 and $Z^2$ in formula 2 independently denotes a monovalent group denoted by —OM or a monovalent group denoted by —O⁻A⁺, with M denoting a hydrogen atom or an alkali metal atom, A⁺ denoting an ammonium cation, and * denoting a bond position with another partial structure constituting the polyester resin.

11. The composition according to claim 10, wherein the divalent connecting group is an alkylene group having 1 to 10 carbon atoms, an alkenylene group having 2 to 10 carbon atoms, or an aromatic group having 6 to 12 carbon atoms.

12. The composition according to claim 10, wherein the divalent connecting group is an alkylene group having 1 to 10 carbon atoms.

13. The composition according to claim 10, wherein the divalent connecting group is an alkenylene group having 2 to 10 carbon atoms.

14. The composition according to claim 10, wherein the divalent connecting group is an aromatic group having 6 to 12 carbon atoms.

15. The composition according to claim 10, which comprises 0.5 to 50.0 weight parts of the polyester resin per 100.0 weight parts of ferromagnetic powder.

16. The composition according to claim 10, wherein the binder is one or more resins selected from the group consisting of a polyurethane resin and a vinyl chloride resin.

17. The composition according to claim 10, wherein an average particle size of the ferromagnetic powder falls within a range of 10 nm to 50 nm.

* * * * *